US012559617B2

(12) United States Patent
Sohn et al.

(10) Patent No.: US 12,559,617 B2
(45) Date of Patent: Feb. 24, 2026

(54) FLUORINE-BASED COMPOSITE POLYMER FILM AND PREPARATION METHOD THEREOF

(71) Applicant: KOREA RESEARCH INSTITUTE OF CHEMICAL TECHNOLOGY, Daejeon (KR)

(72) Inventors: Eun Ho Sohn, Daejeon (KR); Shin Hong Yook, Daejeon (KR); Hong Suk Kang, Daejeon (KR); In Joon Park, Daejeon (KR); Sang Goo Lee, Daejeon (KR); Soo Bok Lee, Daejeon (KR); Won Wook So, Daejeon (KR); Hyeon Jun Heo, Daejeon (KR); Dong Je Han, Daejeon (KR); Seon Woo Kim, Daejeon (KR)

(73) Assignee: Korea Research Institute Of Chemical Technology, Daejeon (KR)

( * ) Notice: Subject to any disclaimer, the term of this patent is extended or adjusted under 35 U.S.C. 154(b) by 807 days.

(21) Appl. No.: 17/768,986

(22) PCT Filed: Sep. 4, 2020

(86) PCT No.: PCT/KR2020/011926
§ 371 (c)(1),
(2) Date: Apr. 14, 2022

(87) PCT Pub. No.: WO2021/080165
PCT Pub. Date: Apr. 29, 2021

(65) Prior Publication Data
US 2024/0101810 A1 Mar. 28, 2024

(30) Foreign Application Priority Data
Oct. 25, 2019 (KR) ........................ 10-2019-0133662

(51) Int. Cl.
*C08L 33/16* (2006.01)
*C09D 133/16* (2006.01)

(52) U.S. Cl.
CPC ............ *C08L 33/16* (2013.01); *C09D 133/16* (2013.01)

(58) Field of Classification Search
None
See application file for complete search history.

(56) References Cited

U.S. PATENT DOCUMENTS

| | | | | |
|---|---|---|---|---|
| 4,826,941 | A * | 5/1989 | Teyssie | G03F 7/039 |
| | | | | 525/271 |
| 6,124,388 | A | 9/2000 | Takai et al. | |
| 6,489,417 | B1 * | 12/2002 | Samukawa | C08F 20/22 |
| | | | | 524/544 |
| 9,850,394 | B2 | 12/2017 | Inaba et al. | |
| 2011/0124816 | A1 * | 5/2011 | Morita | B32B 27/308 |
| | | | | 525/200 |
| 2013/0122309 | A1 * | 5/2013 | Zheng | C09D 127/16 |
| | | | | 524/545 |
| 2015/0147462 | A1 | 5/2015 | Inaba et al. | |
| 2016/0365557 | A1 | 12/2016 | Rao et al. | |
| 2017/0004938 | A1 | 1/2017 | Hintz et al. | |
| 2017/0306174 | A1 | 10/2017 | Inaba et al. | |
| 2019/0280274 | A1 | 9/2019 | Kim et al. | |

FOREIGN PATENT DOCUMENTS

| | | |
|---|---|---|
| JP | H09087574 A | 3/1997 |
| JP | 6448210 B2 | 1/2019 |
| JP | 2019-160792 A | 9/2019 |

(Continued)

OTHER PUBLICATIONS

May May Teoh, et al.; Dual-layer PVDFPTFE composite hollow fibers with a thin macrovoid-free selective layer for water production via membrance distillation; Chemical Engineering Journal 171 (2011) 684-691.
May May Teoh, et al.; Micelle-like macrovoids in mixed matrix PVDF-PTFE hollow fiber membranes; Journal of Membrance Science 338 (2009) 5-10.
International Search Report and Written Opinion for International Application No. PCT/KR2020/011926 dated Dec. 10, 2020.

*Primary Examiner* — Katarzyna I Kolb
(74) *Attorney, Agent, or Firm* — Harness, Dickey & Pierce, P.L.C.

(57) ABSTRACT

The present invention relates to a composition for forming a composite polymer film, a method for preparing the composition for forming a composite polymer film, a composite polymer film and a method for preparing the composite polymer film. The composition for forming a composite polymer film comprises: a fluorine-based polymer solution comprising a fluorine-based polymer; and polyvinylidene fluoride nanoparticles dispersed in the fluorine-based polymer solution. The method for preparing the composition for forming a composite polymer film comprises the steps of: preparing a fluorine-based polymer solution comprising a fluorine-based polymer; and dispersing polyvinylidene fluoride nanoparticles in the fluorine-based polymer solution. The composite polymer film comprises: a polymer matrix formed from a fluorine-based polymer; and polyvinylidene fluoride nanoparticles dispersed in the polymer matrix. The method for preparing the composite polymer film comprises the steps of: preparing a fluorine-based polymer solution comprising a fluorine-based polymer; preparing a composition, for forming a composite polymer film, by dispersing polyvinylidene fluoride nanoparticles in the fluorine-based polymer solution; and forming the composite polymer film by applying the composition for forming a composite polymer film.

7 Claims, 5 Drawing Sheets

(56) References Cited

FOREIGN PATENT DOCUMENTS

| KR | 10-2016-0117109 | A | 10/2016 |
|----|-----------------|---|---------|
| KR | 10-2016-0144911 | A | 12/2016 |
| KR | 10-2017-0101626 | A | 9/2017 |
| KR | 10-2019-0090016 | A | 7/2019 |
| WO | WO-2014-002936 | A1 | 1/2014 |

* cited by examiner

FLUORINE-BASED COMPOSITE POLYMER FILM AND PREPARATION METHOD THEREOF

CROSS-REFERENCE TO RELATED APPLICATIONS

This application is a national phase under 35 U.S.C. § 371 of PCT International Application No. PCT/KR2020/011926 which has an International filing date of Sep. 4, 2020, which claims priority to Korean Patent Application No. 10-2019-0133662, filed Oct. 25, 2019, the entire contents of each of which are hereby incorporated by reference.

TECHNICAL FIELD

The present invention relates to a composition for forming a fluorine-based composite polymer film and a fluorine-based composite polymer film prepared using the same.

BACKGROUND ART

A fluorine-based polymer is a material having properties such as low surface energy, water repellency, lubricity and low refractive index along with excellent heat resistance, chemical resistance and weather resistance, and, starting with household products, has been widely used throughout the industry.

A polymer film formed from a fluorine-based polymer is used as a water repellent coating material due to its low surface energy, water repellency and the like. However, it is generally difficult to obtain sufficient water repellency with a fluorine-based polymer only, and inorganic particles and the like are mixed and used therewith or the coated coating film is surface treated to enhance water repellency.

Moreover, coating a fluorine-based polymer has a problem of reducing transmittance, which leads to a problem of being difficult to use in the fields requiring transmittance as well as water repellent coating.

DISCLOSURE

Technical Problem

One aspect of the present invention is directed to providing a composition for forming a composite polymer film and a composite polymer film exhibiting excellent water repellency.

Another aspect of the present invention is directed to providing a composition for forming a composite polymer film and a composite polymer film having excellent near-infrared transmittance.

Technical Solution

In view of the above, an aspect of the present invention provides a composition for forming a composite polymer film, the composition including a fluorine-based polymer solution including a fluorine-based polymer; and polyvinylidene fluoride nanoparticles dispersed in the fluorine-based polymer solution.

In addition, another aspect of the present invention provides a method for preparing a composition for forming a composite polymer film, the method including the steps of preparing a fluorine-based polymer solution including a fluorine-based polymer; and dispersing polyvinylidene fluoride nanoparticles in the fluorine-based polymer solution.

Furthermore, another aspect of the present invention provides a composite polymer film including a polymer matrix formed from a fluorine-based polymer; and polyvinylidene fluoride nanoparticles dispersed in the polymer matrix.

Furthermore, another aspect of the present invention provides a method for preparing a composite polymer film, the method including the steps of preparing a fluorine-based polymer solution including a fluorine-based polymer; preparing a composition for forming a composite polymer film by dispersing polyvinylidene fluoride nanoparticles in the fluorine-based polymer solution; and forming a composite polymer film by applying the composition for forming a composite polymer film.

Advantageous Effects

A composition for forming a composite polymer film provided in one aspect of the present invention is a composition in which polyvinylidene fluoride nanoparticles are dispersed in a polymer solution in which a fluorine-based polymer is dissolved or dispersed, and a composite polymer film formed using the same exhibits excellent water repellency and near-infrared transmittance at the same time, and is thereby applicable as an infrared-transmitting film material as well as in the field of water repellent coating.

BEST MODE

Figure 1:
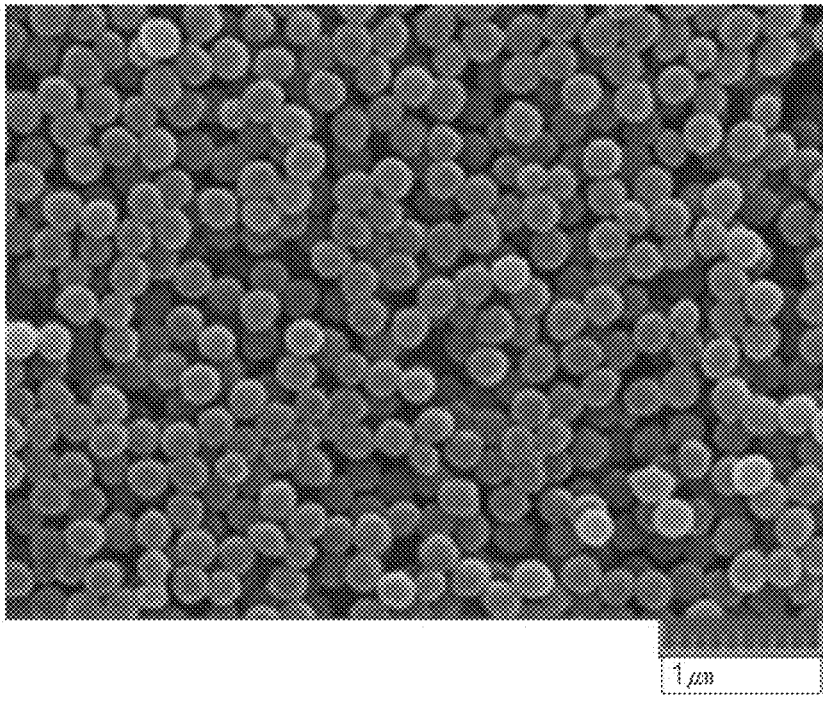
FIG. 1 is a photograph of PVDF nanoparticles prepared in Preparation Example 1 of the present invention observed using a scanning electron microscope (SEM).

One aspect of the present invention provides a composition for forming a composite polymer film, the composition including a fluorine-based polymer solution including a fluorine-based polymer; and polyvinylidene fluoride nanoparticles dispersed in the fluorine-based polymer solution.

Hereinafter, the composition for forming a composite polymer film provided in one aspect of the present invention will be described in detail.

The composition for forming a composite polymer film provided in one aspect of the present invention is a composition in which polyvinylidene fluoride nanoparticles are dispersed in a fluorine-based polymer solution including a fluorine-based polymer as fluorine polymer nanoparticles. A composite polymer film formed using the same may be coated on a transparent base to enhance water repellency and transmittance in a near-infrared region at the same time.

The fluorine-based polymer may be poly(2,2,2-trifluoroethyl methacrylate) (PTFEMA).

The fluorine-based polymer may have a number average molecular weight of 30,000 g/mol to 500,000 g/mol, 60,000 g/mol to 150,000 g/mol, 70,000 g/mol to 120,000 g/mol, and 80,000 g/mol to 100,000 g/mol.

The polyvinylidene fluoride nanoparticles may have a number average molecular weight of 60,000 g/mol to 150,000 g/mol, 70,000 g/mol to 120,000 g/mol, and 80,000 g/mol to 100,000 g/mol.

In the present invention, the number average molecular weight is measured using common methods known in the art, and for example, is measured using a GPC (gel permeation chromatograph) method, however, the method is not limited thereto.

The fluorine-based polymer solution may include a dispersion medium as a solvent. The dispersion medium may be tetrahydrofuran (THF), toluene, methyl ethyl ketone (MEK), benzene, dichloroethane, isopropyl alcohol, ethanol and the like, and as a preferred one example, may be tetrahydrofuran (THF).

In the composition for forming a composite polymer film, the fluorine-based polymer and the polyvinylidene fluoride nanoparticles preferably have a mixing ratio of 40:60 to 60:40 in a weight ratio, more preferably 45:55 to 55:45 in a weight ratio, and most preferably 49:51 to 51:49 in a weight ratio. By employing the mixing ratio of the fluorine-based polymer and the polyvinylidene fluoride nanoparticles in the range as above, the formed composite polymer film may exhibit excellent water repellency and excellent transmittance.

In the composition for forming a composite polymer film, the content of the fluorine-based polymer and the content of the polyvinylidene fluoride nanoparticles are preferably from 1% by weight to 5% by weight, more preferably from 2% by weight to 4% by weight, and most preferably from 2% by weight to 3% by weight with respect to the whole composition. By employing the content of the fluorine-based polymer and the content of the polyvinylidene fluoride nanoparticles in the range as above in the composition, the formed composite polymer film may exhibit excellent water repellency and excellent transmittance.

In addition, another aspect of the present invention provides a method for preparing a composition for forming a composite polymer film including a fluorine-based polymer, polyvinylidene fluoride nanoparticles and a dispersion medium, and as specific one example, the method includes the steps of preparing a fluorine-based polymer solution including a fluorine-based polymer; and dispersing polyvinylidene fluoride nanoparticles in the fluorine-based polymer solution.

Hereinafter, the method for preparing a composition for forming a composite polymer film provided in another aspect of the present invention will be described in detail by each step.

First, the method for preparing a composition for forming a composite polymer film provided in another aspect of the present invention includes the step of preparing a fluorine-based polymer solution including a fluorine-based polymer.

The step is a step of preparing a fluorine-based polymer solution, and prepares a fluorine-based polymer solution by dispersing or dissolving a fluorine-based polymer in a dispersion medium or an organic solvent.

The fluorine-based polymer may be poly(2,2,2-trifluoroethyl methacrylate) (PTFEMA).

The fluorine-based polymer may have a number average molecular weight of 60,000 g/mol to 150,000 g/mol, 70,000 g/mol to 120,000 g/mol, and 80,000 g/mol to 100,000 g/mol.

The fluorine-based polymer solution may include a dispersion medium, and the dispersion medium may be tetrahydrofuran (THF).

Next, the method for preparing a composition for forming a composite polymer film provided in another aspect of the present invention includes the step of dispersing polyvinylidene fluoride nanoparticles in the fluorine-based polymer solution.

In the step, polyvinylidene fluoride nanoparticles are added and dispersed in the fluorine-based polymer solution.

The polyvinylidene fluoride nanoparticles may have a number average molecular weight of 60,000 g/mol to 150,000 g/mol, 70,000 g/mol to 120,000 g/mol, and 80,000 g/mol to 100,000 g/mol.

In the composition for forming a composite polymer film, the fluorine-based polymer and the polyvinylidene fluoride nanoparticles preferably have a mixing ratio of 40:60 to 60:40 in a weight ratio, more preferably 45:55 to 55:45 in a weight ratio, and most preferably 49:51 to 51:49 in a weight ratio. By employing the mixing ratio of the fluorine-based polymer and the polyvinylidene fluoride nanoparticles in the range as above, the formed composite polymer film may exhibit excellent water repellency and excellent transmittance.

In the composition for forming a composite polymer film, the content of the fluorine-based polymer and the content of the polyvinylidene fluoride nanoparticles are preferably from 1% by weight to 5% by weight, more preferably from 2% by weight to 4% by weight, and most preferably from 2% by weight to 3% by weight with respect to the whole composition. By employing the content of the fluorine-based polymer and the content of the polyvinylidene fluoride nanoparticles in the range as above in the composition, the formed composite polymer film may exhibit excellent water repellency and excellent transmittance.

Furthermore, another aspect of the present invention provides a composite polymer film including a polymer matrix formed from a fluorine-based polymer; and polyvinylidene fluoride nanoparticles dispersed in the polymer matrix.

The composite polymer film is formed by applying the composition for forming a composite polymer film described above, and since the composition for forming a composite polymer film is the same as described above, detailed descriptions thereon will not be included below.

The fluorine-based polymer may be poly(2,2,2-trifluoroethyl methacrylate) (PTFEMA).

The fluorine-based polymer may have a number average molecular weight of 60,000 g/mol to 150,000 g/mol, 70,000 g/mol to 120,000 g/mol, and 80,000 g/mol to 100,000 g/mol.

The polyvinylidene fluoride nanoparticles may have a number average molecular weight of 60,000 g/mol to 150,000 g/mol, 70,000 g/mol to 120,000 g/mol, and 80,000 g/mol to 100,000 g/mol.

In the composite polymer film, the fluorine-based polymer and the polyvinylidene fluoride nanoparticles preferably have a mixing ratio of 40:60 to 60:40 in a weight ratio, more preferably 45:55 to 55:45 in a weight ratio, and most preferably 49:51 to 51:49 in a weight ratio. By employing the mixing ratio of the fluorine-based polymer and the polyvinylidene fluoride nanoparticles in the range as above, the composite polymer film may exhibit excellent water repellency and excellent transmittance.

In addition, the composite polymer film has a water contact angle of preferably 105° to 130° and more preferably 109° to 130°, preferably 110° or greater and more preferably 112° to 130°, and preferably 115° or greater and more preferably 115° to 130°.

The water contact angle is measured through a contact angle analyzer. A static contact angle is normally measured, however, obtaining data through a method of measuring a dynamic contact angle is more preferred in terms of accuracy.

Furthermore, the composite polymer film preferably has surface roughness (RMS) of 60 nm to 100 nm, more preferably 65 nm to 95 nm, and most preferably 65 nm to 80 nm.

The surface roughness is obtained through an atomic force microscope, and depending on the calculation method, values such as $R_q$ (root-mean-square roughness), $R_a$ (center-line average roughness), $R_{kv}$ (the values of skewness) and $R_{kur}$ (the values of kurtosis) may be measured, however, a $R_q$ value is commonly used.

In addition, the composite polymer film preferably exhibits transmittance of 91% to 100%, more preferably exhibits transmittance of 92% to 100%, and most preferably exhibits transmittance of 92.5% to 100% in a wavelength region range of 1200 nm to 2000 nm.

Furthermore, another aspect of the present invention provides a method for preparing a composite polymer film, the method including the steps of preparing a fluorine-based polymer solution including a fluorine-based polymer; preparing a composition for forming a composite polymer film by dispersing polyvinylidene fluoride nanoparticles in the fluorine-based polymer solution; and forming a composite polymer film by applying the composition for forming a composite polymer film.

The steps of preparing a fluorine-based polymer solution and preparing a composition for forming a composite polymer film are the same as in the method for preparing a composition for forming a composite polymer film described above, and therefore, detailed descriptions thereon will not be included below.

The step of forming a composite polymer film by applying the composition for forming a composite polymer film may be conducted by spin coating at a rotation speed of 1000 rpm to 3000 rpm.

Hereinafter, the present invention will be described in detail through examples and experimental examples.

However, the following examples and experimental examples are for illustrative purposes only, and the contents of the present invention are not limited by the following examples and experimental examples.

Preparation Example 1

Preparation of Polyvinylidene Fluoride (PVDF) Nanoparticles

In a 1 L high-pressure reactor, a radical initiator (sodium persulfate, 0.558 g), a surfactant (APFO, ammonium perfluorooctanoate, 0.01 g) and distilled water (300 g) were mixed to prepare a solution, and, after reaching a reaction temperature of 82° C. and a pressure of 19.5 bar, a polymerization reaction was conducted by adding vinylidene fluoride (VDF) thereto at a rate of 0.6 g/minute while stirring at a rate of 300 rpm, and as a result, PVDF nanoparticles were prepared.

Figure 2:
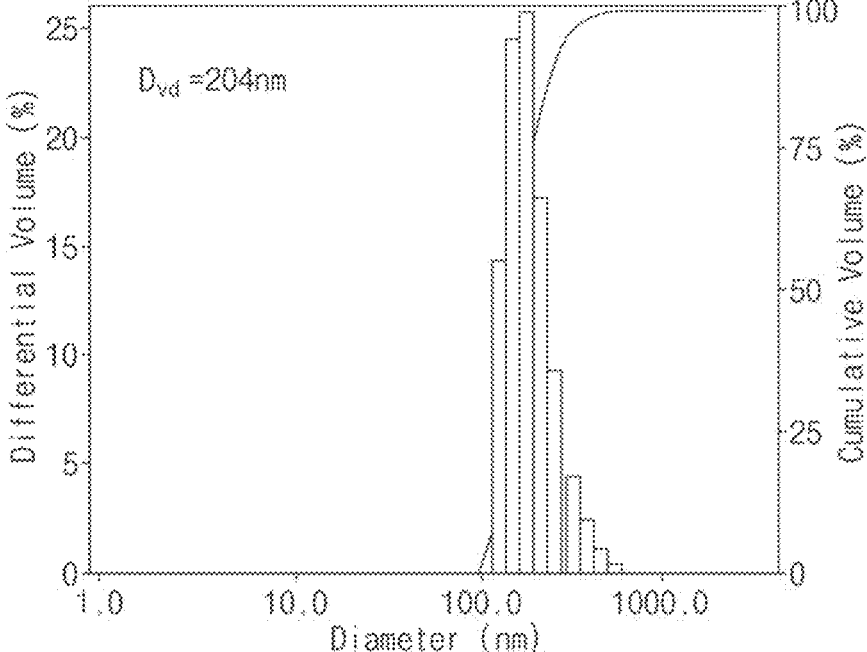
FIG. 2 is a graph analyzing PVDF nanoparticles prepared in Preparation Example 1 of the present invention using a dynamic light scattering (DLS) method.

It was seen that the prepared PVDF nanoparticles were formed in a nanoparticle form as observed with a scanning electron microscope (SEM) (see FIG. 1), and a particle size of around 200 nm was measured through a dynamic light scattering (DLS) method (see FIG. 2).

As shown in the following Table 1, the prepared PVDF nanoparticles had a number average molecular weight of 97,000, a PDI value of 2.8, and a melting point $(T_m)$ of 162.3° C.

TABLE 1

| Category | Number Average Molecular Weight ($M_n$) | PDI ($=M_w/M_n$) | $T_m$ (° C.) ($\Delta$H, J/g) |
|---|---|---|---|
| Preparation Example 1 | 97,000 | 2.8 | 162.3 (53.5) |

Preparation Example 2

Preparation of Poly(2,2,2-Trifluoroethyl Methacrylate) (PTFEMA)

In a 100 mL reactor, 2,2,2-trifluoroethyl methacrylate (TFEMA, 4.0 g), an initiator (AIBN, 1 wt %) and tetrahydrofuran (THF, 8 mL) were all mixed to prepare a solution, and reacted for 18 hours at 60° C. to prepare PTFEMA.

As shown in the following Table 2, the prepared PTFEMA had a number average molecular weight of 98,000, a PDI value of 2.9, and a glass transition temperature $(T_g)$ of 79.6° C.

TABLE 2

| Category | Number Average Molecular Weight ($M_n$) | PDI ($=M_w/M_n$) | $T_g$ (° C.) |
|---|---|---|---|
| Preparation Example 2 | 98,000 | 2.9 | 79.6 |

Example 1

Preparation of Composite Polymer Film-1

The PVDF nanoparticles prepared in Preparation Example 1 and the PTFEMA prepared in Preparation Example 2 were mixed in a ratio of 50:50 (wt %), and added to tetrahydrofuran (THF) in a concentration of 1 wt % to prepare a composition for forming a composite polymer film.

The prepared composition for forming a composite polymer film was applied on a glass substrate, and spin coated for 30 seconds at a rotation speed of 2000 rpm to form a composite polymer film.

Example 2

Preparation of Composite Polymer Film-2

A composite polymer film was formed in the same manner as in Example 1, except that the mixture of PVDF nanoparticles and PTFEMA was added to THF in a concentration of 2 wt % to form a composition for forming a composite polymer film.

Example 3

Preparation of Composite Polymer Film-3

A composite polymer film was formed in the same manner as in Example 1, except that the mixture of PVDF nanoparticles and PTFEMA was added to THF in a concentration of 3 wt % to form a composition for forming a composite polymer film.

Example 4

Preparation of Composite Polymer Film-4

A composite polymer film was formed in the same manner as in Example 1, except that the mixture of PVDF nanoparticles and PTFEMA was added to THF in a concentration of 4 wt % to form a composition for forming a composite polymer film.

Example 5

Preparation of Composite Polymer Film-5

A composite polymer film was formed in the same manner as in Example 1, except that the mixture of PVDF nanoparticles and PTFEMA was added to THF in a concentration of 5 wt % to form a composition for forming a composite polymer film.

Comparative Example 1

Preparation of PTFEMA Polymer Film

The PTFEMA prepared in Preparation Example 2 was added to tetrahydrofuran (THF) in a concentration of 1 wt % to prepare a PTFEMA solution.

The prepared PTFEMA solution was applied on a glass substrate, and spin coated for 30 seconds at a rotation speed of 2000 rpm to form a PTFEMA polymer film.

Comparative Example 2

Preparation of PVDF Nanoparticle Film

The PVDF nanoparticles prepared in Preparation Example 1 were added to tetrahydrofuran (THF) in a concentration of 1 wt % to prepare a PVDF nanoparticle solution.

The prepared PVDF nanoparticle solution was applied on a glass substrate, and spin coated for 30 seconds at a rotation speed of 2000 rpm to form a PVDF nanoparticle film.

Experimental Example 1

Analysis on Surface Roughness of Polymer Film

In order to identify surface roughness of the composite polymer film provided in one aspect of the present invention, the composite polymer films or the polymer films prepared in Examples 1 to 5 and Comparative Example 1 were observed using an atomic force microscope (AFM), and the results are shown in the following Table 3.

TABLE 3

|  | Comparative Example 1 | Example 1 | Example 2 | Example 3 | Example 4 | Example 5 |
|---|---|---|---|---|---|---|
| Surface Roughness (RMS Roughness) (nm) | <1 | 87.2 | 75.1 | 66.4 | 90.6 | 77.4 |

As shown in Table 3, it was identified that the composite polymer film provided in one aspect of the present invention had surface roughness of 66.4 nm to 90.6 nm. It was identified that the roughness rapidly increased from 1 nm or less to 66 nm or greater by compositing the PVDF nanoparticles to the pure PTFEMA polymer film.

Experimental Example 2

Analysis on Water Contact Angle of Polymer Film

In order to identify water repellency of the composite polymer film provided in one aspect of the present invention, water was applied on the surfaces of the composite polymer films or the polymer films prepared in Examples 1 to 5, Comparative Example 1 and Comparative Example 2 to measure a contact angle, and the results are shown in the following Table 4.

TABLE 4

|  | Comparative Example 1 | Example 1 | Example 2 | Example 3 | Example 4 | Example 5 |
|---|---|---|---|---|---|---|
| Contact Angle ($\theta$) | 102.0° | N/A | 118.6° | 120.5° | 112.3° | 109.6° |

As shown in Table 4, a much more improved hydrophobic surface was able to be obtained compared to Comparative Example 1, a pure PTFEMA polymer film. The composite polymer film of Example 3 had a water contact angle of approximately 120.5°, whereas the pure PTFEMA polymer film had a water contact angle of 102°. On the other hand, the pure PVDF nanoparticle film (Comparative Example 2) was very unstable in water, and the film was measured to be destroyed when measuring the contact angle. Through the results, applicability as an excellent water repellent material was identified.

Experimental Example 3

Analysis on Optical Properties of Polymer Film

Figure 3:
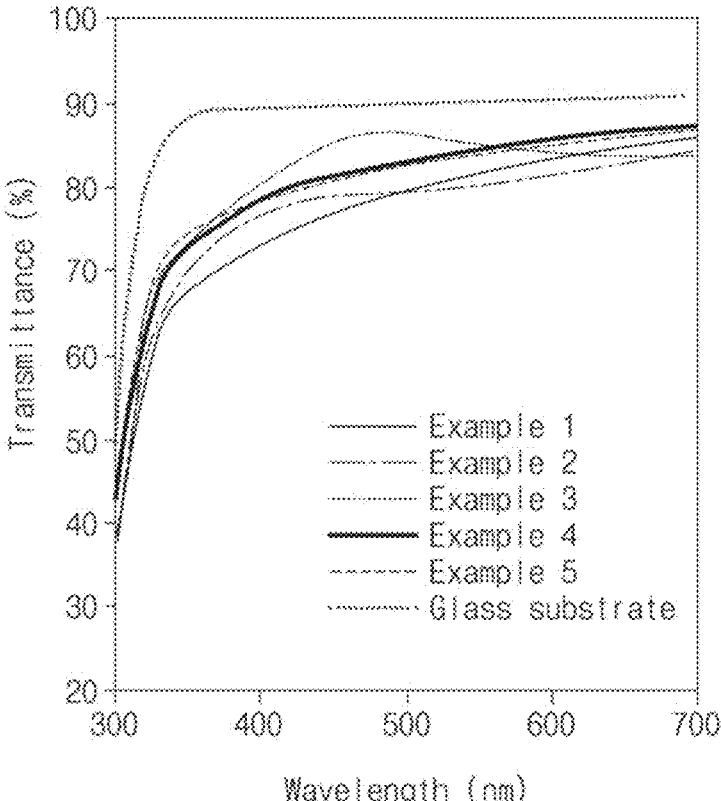
FIG. 3 and FIG. 4 are graphs analyzing transmittance of composite polymer films of Example 1 to Example 5 according to Experimental Example 3 of the present invention.
Figure 4:
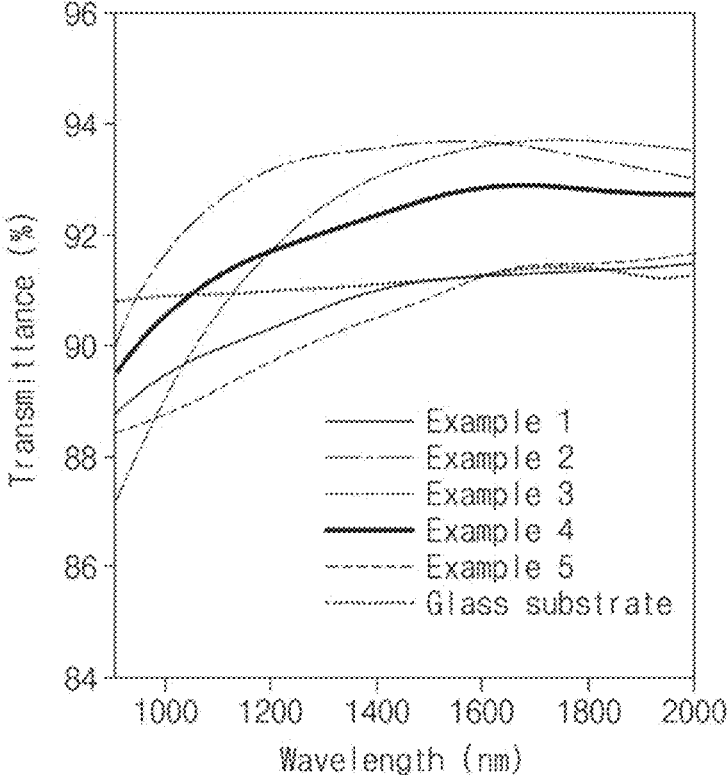

In order to identify transmittance of the composite polymer film provided in one aspect of the present invention, transmittance of the composite polymer films or the polymer films prepared in Examples 1 to 5 was measured, and the results are shown in FIG. 3 and FIG. 4.

As shown in FIG. 3, it was identified that, although lower than a glass substrate, transmittance of approximately 80% or greater was obtained in a wavelength region range of 300 nm to 700 nm.

In addition, as shown in FIG. 4, it was identified that the composite polymer films of Example 2 and Example 3 had more superior transmittance than a glass substrate in a wavelength region range of 1000 nm to 2000 nm, particularly, a wavelength region range of 1200 nm to 2000 nm. This is a result of rapidly enhancing near-infrared ray transmittance while lowering ultraviolet and visible light transmittance, and it was identified that the composite polymer film provided in one aspect of the present invention is applicable in distance sensors such as LiDAR, biometric sensors, infrared cameras and the like.

As described above, the composition for forming a composite polymer film provided in one aspect of the present invention is a composition in which polyvinylidene fluoride nanoparticles are dispersed in a polymer solution in which a fluorine-based polymer is dissolved or dispersed, and the composite polymer film formed using the same exhibits excellent water repellency and near-infrared transmittance at the same time, and is thereby applicable as an infrared-transmitting film material as well as in the field of water repellent coating.

Experimental Example 4

Analysis on Surface of Polymer Film

Figure 5:
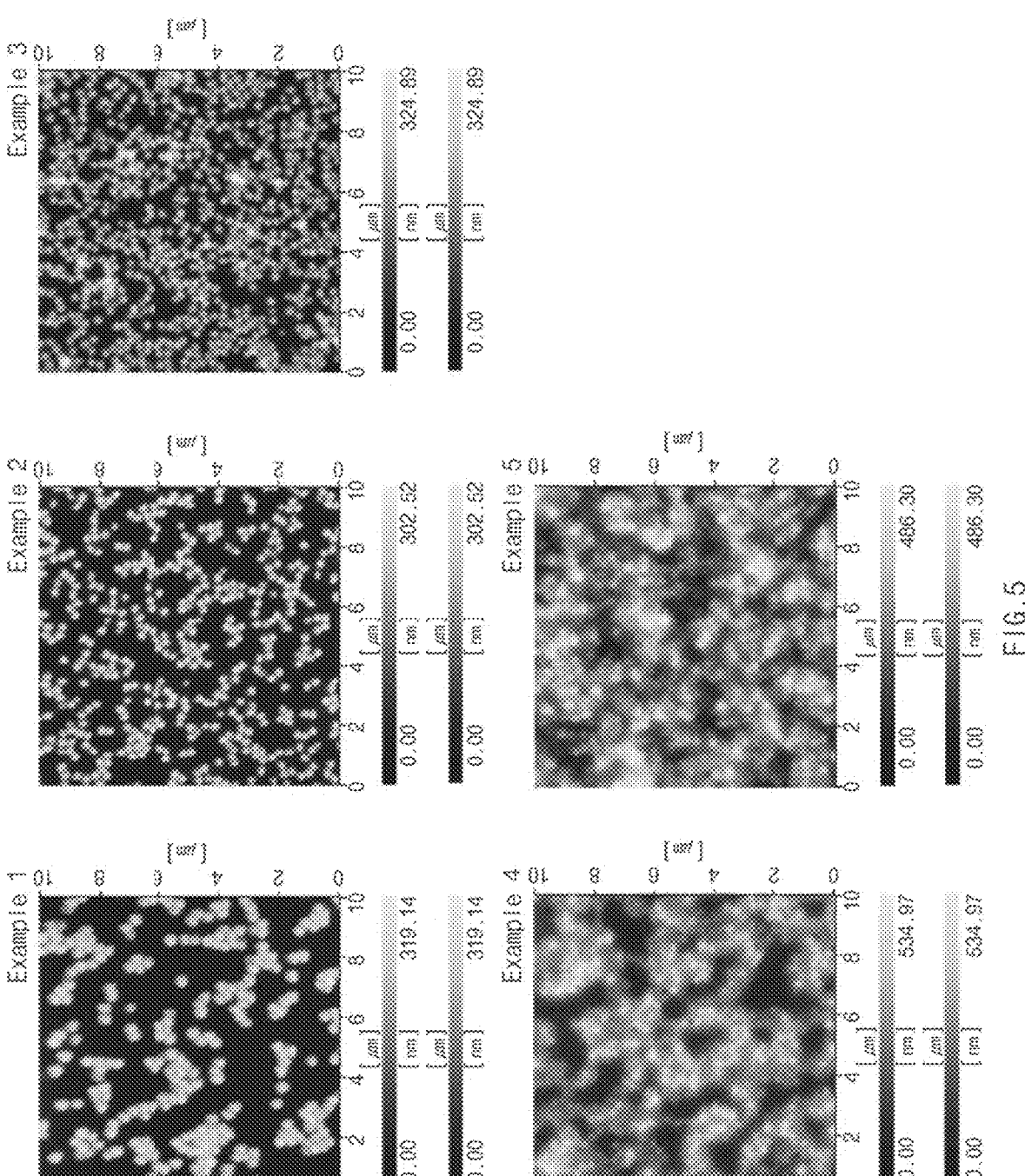
FIG. 5 is a diagram showing results of measuring surfaces of composite polymer films of Example 1 to Example 5 using an atomic force microscope according to Experimental Example 4 of the present invention.

In order to identify transmittance of the composite polymer film provided in one aspect of the present invention, results of measuring the composite polymer films prepared in Examples 1 to 5 using an atomic force microscope are shown in FIG. 5.

As shown in FIG. 5 (bright parts in the drawing are actually red, and dark parts in the drawing are actually dark-red), it was identified that the composite polymer films of Examples 1 to 5 were very uniformly well mixed by using PVDF nanoparticles (corresponding to bright parts in the drawing).

The invention claimed is:

1. A composition for forming a composite polymer film comprising:
   a fluorine-based polymer solution comprising a fluorine-based polymer; and
   polyvinylidene fluoride nanoparticles dispersed in the fluorine-based polymer solution,
   wherein a content of the fluorine-based polymer and a content of the polyvinylidene fluoride nanoparticles are from 1% by weight to 5% by weight with respect to the whole composition.

2. The composition for forming a composite polymer film of claim 1, wherein the fluorine-based polymer is poly(2,2, 2-trifluoroethyl methacrylate) (PTFEMA).

3. The composition for forming a composite polymer film of claim 2, wherein the fluorine-based polymer has a number average molecular weight of 30,000 g/mol to 500,000 g/mol.

4. The composition for forming a composite polymer film of claim 1, wherein the fluorine-based polymer solution comprises a dispersion medium.

5. The composition for forming a composite polymer film of claim 4, wherein the dispersion medium is one or more types selected from the group consisting of tetrahydrofuran (THF), toluene, methyl ethyl ketone (MEK), benzene, dichloroethane, isopropyl alcohol and ethanol.

6. The composition for forming a composite polymer film of claim 1,
   wherein the fluorine-based polymer and the polyvinylidene fluoride nanoparticles have a mixing ratio of 40:60 to 60:40 in a weight ratio.

7. A method for preparing a composition for forming a composite polymer film comprising the steps of:
   preparing a fluorine-based polymer solution comprising a fluorine-based polymer; and
   dispersing polyvinylidene fluoride nanoparticles in the fluorine-based polymer solution,
   wherein a content of the fluorine-based polymer and a content of the polyvinylidene fluoride nanoparticles are from 1% by weight to 5% by weight with respect to the whole composition.

* * * * *